United States Patent [19]

Simon et al.

[11] 3,719,743
[45] March 6, 1973

[54] MAGNESIUM CHLORIDE DEHYDRATION

[75] Inventors: Maurice M. Simon; Jakob de Swaan Arons, both of Amsterdam, Netherlands

[73] Assignee: Shell Oil Company, New York, N.Y.

[22] Filed: Feb. 26, 1971

[21] Appl. No.: 119,242

[30] Foreign Application Priority Data

March 31, 1970 Netherlands .......................7004512

[52] U.S. Cl. .............................................423/498
[51] Int. Cl. .............................................C01f 5/34
[58] Field of Search ..............23/91, 1 F, 154, 50 R; 423/498

[56] References Cited

UNITED STATES PATENTS

| | | | |
|---|---|---|---|
| 3,338,668 | 8/1967 | Lyons et al. | 23/91 |
| 3,346,333 | 10/1967 | Nadler | 23/91 |
| 3,347,626 | 10/1967 | Nightingale, Jr. | 23/91 |
| 3,395,977 | 8/1968 | Nadler | 23/91 |
| 3,493,333 | 2/1970 | Larson | 23/91 |

Primary Examiner—Edward Stern
Attorney—Howard W. Haworth and Martin S. Baer

[57] ABSTRACT

A two-step process for the dehydration of magnesium chloride is disclosed. In the first step an aqueous slurry of magnesium chloride crystals in from 2 to 4 moles of water per mole of magnesium chloride is formed. In the second step this water is removed in a fluidized bed in the presence of added hydrochloric acid gas.

3 Claims, 2 Drawing Figures

INVENTORS:
MAURICE M. SIMON
JAKOB DE SWAAN ARONS
BY: *Howard W. Haworth*
THEIR ATTORNEY

MAGNESIUM CHLORIDE DEHYDRATION

BACKGROUND OF THE INVENTION

1. Field of the Invention

This invention relates to an improved process for the dehydration of magnesium chloride. More particularly it is directed to the use of a two-step dehydration in a process for preparing high purity anhydrous magnesium chloride.

2. The Prior Art

Magnesium is commercially produced by electrolyzing fused magnesium chloride. For the magnesium to be acceptable it must be of high purity. To achieve this purity, it is essential that the magnesium chloride starting material be anhydrous and free of major contaminants. The relatively low selling prices of magnesium coupled with the major expense of electrolytic processing require that this pure anhydrous magnesium chloride be prepared from low cost feed stocks, either sea water salt concentrates or brines formed by leaching magnesium chloride-containing salt deposits, and further that the purification and dehydration be effected as economically as possible. As a result, relatively minor process changes which reduce equipment cost or lower operating expenses by but a small amount can be of major importance.

The preparation of anhydrous magnesium chloride from aqueous solutions poses special problems. Without special precautions, evaporation of water is accompanied by hydrolysis of the $MgCl_2$ via reactions illustrated by an equation of the type $MgCl_2 \cdot X\ H_2O \rightarrow Mg(OH)Cl + (X-1)H_2O$.

$Mg(OH)Cl$ is not a suitable starting material for electrolytic magnesium preparation and thus its formation is to be minimized.

A three stage dehydration process has been proposed in U.S. Pat. No. 3,395,977. The first stage removes only enough water to form the hydrate $MgCl_2 \cdot 4H_2O$, while enough water is removed in the second stage to form $MgCl_2 \cdot 2H_2O$, and the third stage forms the final $MgCl_2$. All three stages employ fluidized beds, the third using HCl as fluiziding gas. This use of three separate fluizided beds is cumbersome and costly.

In another known process, i.e., that of U.S. Pat. No. 3,346,333 an aqueous solution of magnesium chloride is first concentrated to a solution containing 4.2–4.4 moles of water per mole of magnesium chloride. Then, in a second stage this solution is atomized in a fluidized bed, the fluidizing gas of which consists partly or completely of HCl, to remove the remaining water. This method has the disadvantage that a large quantity of water (4.2–4.4 moles per mole) must be removed in the second (fluidized bed) stage. A considerable quantity of the heat necessary to evaporate this water must be supplied via the walls of the fluidized bed. Thus, if extremely high wall temperatures are to be avoided, complicated and expensive special fluidized beds must often be employed.

The 4.2–4.4 moles per mole of water employed in the above process is not an arbitrarily selected number. This is the smallest amount of water in which $MgCl_2$ will form true solutions without resort to extremely high temperatures and pressures.

It would be highly desirable to have a process which would prepare anhydrous magnesium chloride with simple apparatus and without high temperatures and pressures.

STATEMENT OF THE INVENTION

It has now been found that anhydrous magnesium chloride can be prepared from an aqueous solution by, in a first step, evaporating water from the aqueous solution at a temperature of from 200° to 300°C and a pressure of from 2 to 5 atmospheres to give a slurry containing magnesium chloride crystals in from 2 to 4.0 moles of water per mole of magnesium chloride and thereafter, in a second step, removing the remaining water in a fluidized bed employing an HCl-containing drying gas at a temperature of from 250° to 400°C and a pressure of from 1 to 10 atmospheres. This process is simple, requiring a minimum of apparatus, and achieves an anhydrous product without the use of high temperatures or pressures.

This invention will be further described with reference to the accompanying drawing wherein FIG. 1 is a graph illustrating preferred conditions for effecting dehydration; and FIG. 2 represents more or less diagrammatically a cross-sectional view of one form of apparatus suitable for carrying out the process of the invention.

DESCRIPTION OF THE PREFERRED EMBODIMENTS

Figure 1:
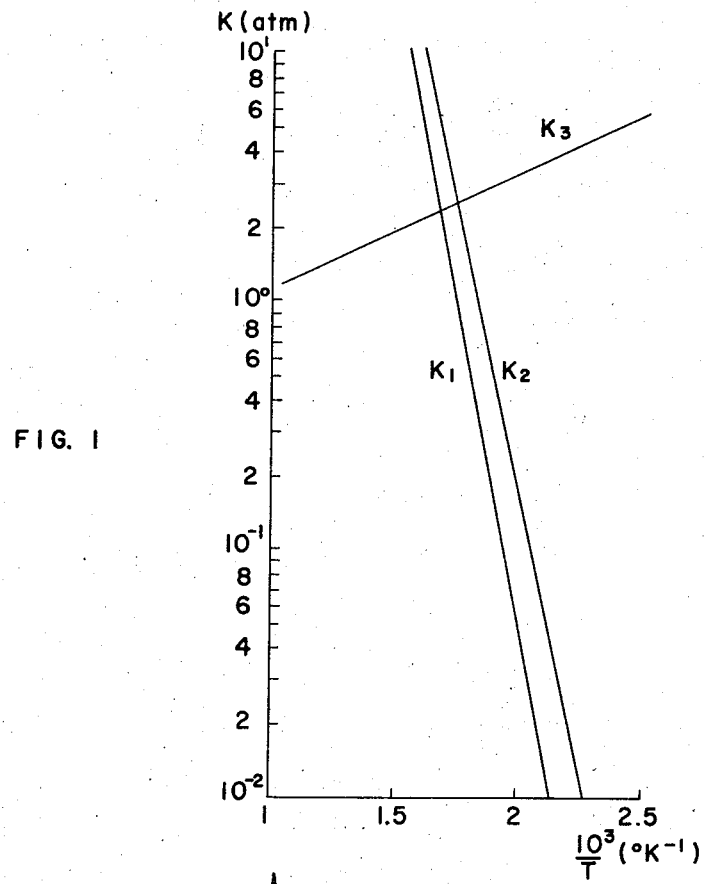

The extent of evaporation in the first step of this process is critical. If greater than 4 moles of water per mole of magnesium chloride are left following the initial evaporation, the second (fluidized bed) step will be inefficient. If it is attempted to leave less than 2 moles of water, undesired hydrolysis will occur. Preferably enough water is removed in the first stage to give a slurry of magnesium chloride having a water to salt molar ratio in the range of from 2.5 to 3.5. Such a slurry is easily pumpable and contains a quantity of water which can easily be removed in the fluidized bed in the second stage.

Evaporation in the first stage is carried out at a temperature preferably in the range of 200°C to 300°C, most preferably 225°C to 300°C. At these temperatures, it is most desirable to employ pressures of from 2 to 5 atmospheres absolute. Higher pressures are not necessary and are not preferred since they give lower evaporation rates.

The first stage evaporation can be carried out as a batch operation. Preferably, however, for economy of operation in commercial-scale applications, the first stage evaporation is carried out continuously. This mode of operation may be effected by employing one or a plurality of evaporators in series, operating at steady state conditions. It is desirable to provide agitation during passage through these evaporators. The slurry of magnesium chloride in water prepared in the evaporators is then passed, for example by pumping, to the fluidized bed of the second step. The slurry is preferably fed into the fluidized bed below the free surface of the fluidized bed, although supply of the slurry at or somewhat above the free surface of the fluidized bed may be used. The slurry is preferably atomized into the fluidized bed, if desired by means of a gas, such as hydrochloric acid or a gas that is inert with respect to magnesium chloride, hydrochloric acid, and water, for example, nitrogen or air.

The temperature of the fluidized bed must be kept below the melting point of magnesium chloride and one preferably uses temperatures of between 250°C and 500°C, in particular between 250°C and 400°C.

The fluidizing gas in the fluidized bed is a drying gas, that is a gas capable of removing water from $MgCl_2 \cdot H_2O$ without appreciable hydrolysis to $Mg(OH)Cl$ occurring. The exact composition of the fluidizing gas will change as it passes through the bed since it will pick up water vapor but the composition of the fluidizing gas at all points in the bed should be that of a drying gas.

The drying gas preferably contains hydrochloric acid and at most a controlled amount of water vapor. The amounts of hydrochloric acid and water in the drying gas can be calculated on the basis of the thermodynamics of the three reactions involved in the dehydration. These reactions are $MgCl_2 \cdot H_2O(s) \rightleftarrows MgCl_2(s) + H_2O$    1.
$MgCl_2 \cdot H_2O(s) \rightleftarrows Mg(OH)Cl(s) + HCl$    2.
$MgCl_2(s) + H_2O \rightleftarrows Mg(OH)Cl(s) + HCl$    3.

In formulas (1), (2) and (3) the letter (s) indicates that the proceeding compound is in the solid state. Thus, at a given temperature the equilibrium constants for these three reactions, i.e., $K_2K_2$ and $K_3$ are represented by $K_1 = P_{H_2O}$    $K_2 = P_{HCl}$    $K_3 = P_{HCL}/P_{H_2O}$ in which $P_{H_2O}$ and $P_{HCl}$ represent the equilibrium partial pressure of $H_2O$ and $HCl$ at the given temperature. Using known thermodynamic data (National Bureau of Standards - Circular 500, *Selected values of Chemical Thermodynamic Properties* (1952), $K_1$, $K_2$ and $K_3$ can be calculated for any temperature. These equilibrium constants are plotted in FIG. 1.

To convert $MgCl_2 \cdot H_2O$ into anhydrous $MgCl_2$, reaction (1) must proceed while any $Mg(OH)Cl$ formed by reaction (2) must be converted by reaction (3) into anhydrous $MgCl_2$. A drying gas thus requires $P_{H_2O}$ to be smaller than $K_1$ and $P_{HCl}/P_{H_2O}$ to be larger than $K_3$. Preferably, the formation of $Mg(OH)Cl$ via reaction (2) will be suppressed as much as possible. To this end, the $P_{HCl}$ of the drying gas should preferably be chosed larger than $K_2$. For example, if the fluidized bed is to be maintained at a temperature of 320°C, one can determine from FIG. 1 the requirement that in the drying gas $P_{H_2O}$ must be less than 0.9 atmosphere and the preferably $P_{HCl}$ be greater than 2.1 atmospheres. Under these conditions, the total pressure of the drying gas will preferably be at least about 3 atmospheres. The partial pressures, $P_{HCl}$ and $P_{H_2O}$, can be controlled by the quantity of hydrochloric acid gas supplied to the fluidized bed and by the quantity of water evaporated from the slurry supplied to the fluidized bed, which quantity of water can be controlled by the rate at which the slurry is fed to the fluidized bed.

Preferably total pressure of the drying gas in the fluidized bed is between 1 and 10 atmospheres absolute, in particular between 2 and 6 atmospheres absolute.

Hydrochloric acid can be fed to the fluidized bed as such or mixed with an inert gas such as air or nitrogen. The hydrochloric acid added may be anhydrous gas (also more properly termed hydrogen chloride) or may contain some water, provided care is taken that the atmosphere in the fluidized bed continues to consist of a drying gas. Preferably, the fluidizing gas fed into the fluidized bed consists of at least 50 percent m, most preferably 70 percent m of hydrochloric acid.

The solid material fluidized in the fluidized bed consists mainly of anhydrous magnesium chloride. This anhydrous magnesium chloride can be removed continuously from the fluidized bed or may be removed batchwise.

The fluidizing gas leaving the fluidized bed will comprise hydrochloric acid and water and any inert gases brought into the fluidized bed.

It is advantageous if immediately before and/or immediately after leaving the apparatus containing the fluidized bed, entrained particles of magnesium chloride are recovered from the fluidizing gas, for example by means of one or more cyclones and/or filters. The separated solid particles are suitably returned to the fluidized bed.

If desired, the water can be removed partly or completely from the gas discharged, and the gas can then be recycled.

Figure 2:
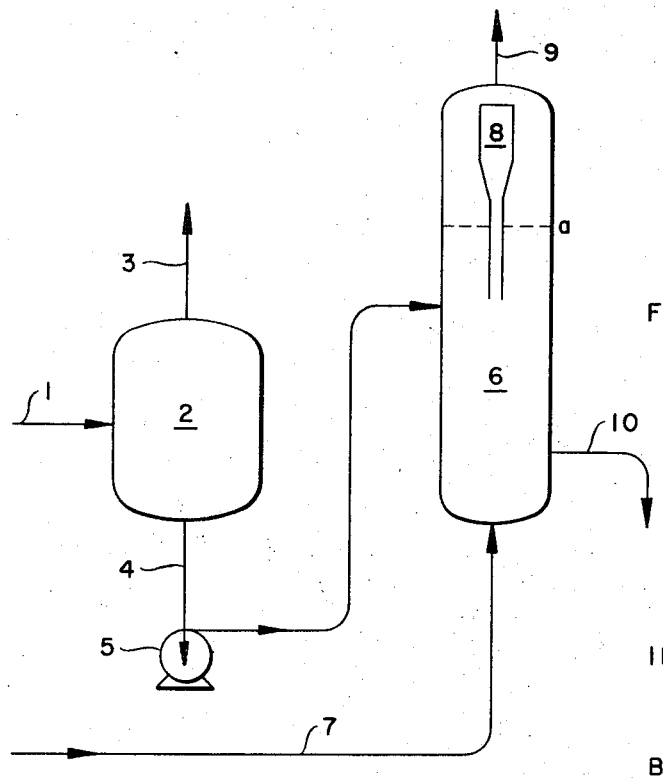

The process of the invention is further described with reference to FIG. 2. A crude magnesium chloride solution, obtained by concentrating sea water or preferably by water-leaching magnesium chloride-containing salt deposits, is purified by means not shown to precipitate any sulfates present, convert any bromides to chlorides and to selectively crystallize out sodium and potassium chlorides. Such solution is fed through line 1 to evaporator 2. This feed typically contains about 30 percent by weight of magnesium chloride, about 0.1 percent by weight of potassium chloride and about 0.35 percent by weight of sodium chloride as its major salt constituents. Evaporator 2 is operated at a temperature of 230°C and a pressure of 3.5 atmospheres absolute. Water is evaporated and passes as vapor from evaporator 2 through line 3. A slurry of $MgCl_2 \cdot 2H_2O$ crystals in a saturated aqueous solution of magnesium chloride, containing about 3.0 moles of water per mole of magnesium chloride is removed through line 4 and passed by pump 5 to fluidized bed 6. Fluidized bed 6 has a bed depth up to line a, the space above a being freeboard. The fluidized particles consist of anhydrous magnesium chloride. They are fluidized by means of dry hydrochloric acid gas which is added through line 7 at a pressure of 2.5 atmospheres absolute. The quantity of hydrochloric acid gas fed is controlled so that all the water is removed from the slurry without the partial pressure of the hydrochloric acid dropping below 2.3 atm absolute. The temperature of the fluidized bed is kept at 320°C. The slurry is fed at such a rate that drying takes place, i.e., that the partial pressure of the water is always below 0.9 atmospheres. The used drying gas is passed through cyclone 8 to recover solids before leaving the reactor containing the fluidized bed through line 9. The gas may, if desired, be dried by means not shown and recycled to line 7. The anhydrous magnesium chloride is discharged from the fluidized bed through line 10.

We claim as our invention

1. A two stage process for the preparation of anhydrous magnesium chloride from an aqueous solution of magnesium chloride which comprises evaporating sufficient water from the solution in a first stage at a temperature in the range of from 200° to 300°C and a pressure of from 2 to 5 atmospheres to form a slurry of magnesium chloride containing from 2.5 to 3.5 moles of water per mole of magnesium chloride and thereafter fluidizing this slurry in a second stage in a fluidized bed wherein the solid bed material fluidized consists of essentially anhydrous magnesium chloride with a drying gas containing hydrochloric acid at a temperature in the range of from 250° to 400°C and a pressure of from 1 to 10 atmospheres, thereby separating anhydrous magnesium chloride from the remaining water.

2. The process in accordance with claim 1 wherein the drying gas contains at least 50 percent by mole of hydrochloric acid.

3. The process in accordance with claim 2, wherein the second stage is operated at a pressure of from 2 to 6 atm absolute and the fluidizing gas contains from 70 to 100 percent by mole of hydrochloric acid.

* * * * *